(12) United States Patent
Lyle et al.

(10) Patent No.: US 7,716,294 B2
(45) Date of Patent: May 11, 2010

(54) METHOD, SYSTEM, AND COMPUTER PROGRAM PRODUCT FOR PROVIDING AN INSTANT MESSAGING INTERFACE WITH DYNAMICALLY GENERATED MESSAGE BUTTONS

(75) Inventors: Ruthie D. Lyle, Durham, NC (US); Fonda J. Daniels, Cary, NC (US)

(73) Assignee: International Busines Machines Corporation, Armonk, NY (US)

( * ) Notice: Subject to any disclaimer, the term of this patent is extended or adjusted under 35 U.S.C. 154(b) by 900 days.

(21) Appl. No.: 11/221,141

(22) Filed: Sep. 7, 2005

(65) Prior Publication Data
US 2007/0055729 A1    Mar. 8, 2007

(51) Int. Cl.
G06F 15/16    (2006.01)
G06F 3/00    (2006.01)

(52) U.S. Cl. .................. 709/206; 715/744; 715/758

(58) Field of Classification Search ......... 709/204–207, 709/217–219; 345/760; 714/46; 715/744, 715/758
See application file for complete search history.

(56) References Cited

U.S. PATENT DOCUMENTS

| | | | |
|---|---|---|---|
| 5,301,348 A * | 4/1994 | Jaaskelainen | 714/46 |
| 6,607,136 B1 * | 8/2003 | Atsmon et al. | 235/492 |
| 6,640,230 B1 | 10/2003 | Alexander et al. | |
| 6,731,308 B1 | 5/2004 | Tang et al. | |
| 2002/0143876 A1 | 10/2002 | Boyer et al. | |
| 2002/0147777 A1 | 10/2002 | Hackbarth et al. | |
| 2003/0097406 A1 | 5/2003 | Stafford | |
| 2003/0122870 A1 * | 7/2003 | Aggarwal et al. | 345/760 |
| 2003/0210265 A1 | 11/2003 | Haimberg | |
| 2003/0229670 A1 * | 12/2003 | Beyda | 709/206 |
| 2004/0133638 A1 | 7/2004 | Doss et al. | |
| 2004/0162882 A1 | 8/2004 | Mora | |
| 2004/0268265 A1 | 12/2004 | Berger | |
| 2005/0251555 A1 * | 11/2005 | Little | 709/206 |
| 2006/0075029 A1 * | 4/2006 | Kelso et al. | 709/206 |

\* cited by examiner

*Primary Examiner*—Joseph E. Avellino
*Assistant Examiner*—Kiet Tang
(74) *Attorney, Agent, or Firm*—Ayla Lari; Hoffman Warnick LLC

(57) ABSTRACT

The present invention provides a method, system, and computer program product for providing an instant messaging (IM) interface with dynamically generated message buttons. A method in accordance with an embodiment of the present invention includes: retrieving information from a user associated application; dynamically generating a message button based on the retrieved information and a user policy; and rendering the dynamically generated message button on the IM interface.

27 Claims, 10 Drawing Sheets

METHOD, SYSTEM, AND COMPUTER PROGRAM PRODUCT FOR PROVIDING AN INSTANT MESSAGING INTERFACE WITH DYNAMICALLY GENERATED MESSAGE BUTTONS

BACKGROUND OF THE INVENTION

1. Field of the Invention

The present invention generally relates to graphical user interfaces, and more specifically relates to a method, system, and computer program product for providing an instant messaging interface with dynamically generated message buttons.

2. Related Art

Instant messaging (IM) is a powerful and widely used form of electronic communication. Each participant in an IM session ("chat") uses an IM interface provided by an IM client to read and post messages. Buttons are presented on the IM interface that allow a user to send a message, invite additional users to join the IM session, close the IM session, etc. An example of such an IM interface 10 is depicted in FIG. 1. As shown, the IM interface 10 generally includes a conversation pane 12 for displaying a history of an IM session, a message pane 14 for displaying an IM message 16 to be sent, a Send button 18 for sending the IM message in the message pane 14 to the IM users involved in the IM session, an Invite Others button 20 for inviting other IM users into the IM session, and a Close button 22 for closing the IM interface 10. The Send button 18, Invite Others button 20, and Close button 22 are static in nature, always present on the IM interface 10, and are configured to initiate a single predefined action when actuated by a user.

During an IM session, a user may have to answer the phone, leave for a meeting, or perform other tasks. As a result, the user will typically compose and send a message to this effect to the other users participating in the IM session. If the user is participating in multiple simultaneous IM sessions, the user will typically compose and send the same message to the users participating in each of the multiple IM sessions. The typing (and retyping) of such messages is an inefficient and time consuming task, especially when the same message is composed and sent multiple times.

SUMMARY OF THE INVENTION

In general, the present invention provides a method, system, and computer program product for providing an IM interface with dynamically generated message buttons. A managing application retrieves information from one or more applications/backend systems with which a user has established an association. Under certain conditions during an IM session, the retrieved information is formatted and one or more of the message buttons are dynamically generated and rendered in real-time on the IM interface. A user policy defines when, how, and under what circumstances a message button is dynamically generated and displayed on the IM interface.

A first aspect of the present invention is directed to a method for providing an IM interface with a dynamically generated message button, comprising: retrieving information from a user associated application; dynamically generating a message button based on the retrieved information and a user policy; and rendering the dynamically generated message button on the IM interface.

A second aspect of the present invention is directed to a system for providing an IM interface with a dynamically generated message button, comprising: a system for retrieving information from a user associated application; a system for dynamically generating a message button based on the retrieved information and a user policy; and a system for rendering the dynamically generated message button on the IM interface.

A third aspect of the present invention is directed to a program product stored on a computer readable medium for providing an IM interface with a dynamically generated message button, the computer readable medium comprising program code for performing the following steps: retrieving information from a user associated application; dynamically generating a message button based on the retrieved information and a user policy; and rendering the dynamically generated message button on the IM interface.

A fourth aspect of the present invention is directed to a method for deploying an application for providing an IM interface with a dynamically generated message button, comprising: providing a computer infrastructure being operable to: retrieve information from a user associated application; dynamically generate a message button based on the retrieved information and a user policy; and render the dynamically generated message button on the IM interface.

A fifth aspect of the present invention is directed to a computer software embodied in a propagated signal for providing an instant messaging (IM) interface with a dynamically generated message button, the computer software comprising instructions to cause a computer system to perform the following functions: retrieve information from a user associated application; dynamically generate a message button based on the retrieved information and a user policy; and render the dynamically generated message button on the IM interface.

A sixth aspect of the present invention is directed to a method for providing an IM interface, comprising: retrieving information from an application; dynamically generating a message button based on the retrieved information and a user policy, wherein the dynamically generated message button is associated with a predefined IM message; rendering the dynamically generated message button on the IM interface; and sending the predefined IM message to at least one participant in an IM session in response to an actuation of the dynamically generated message button.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Figure 1:
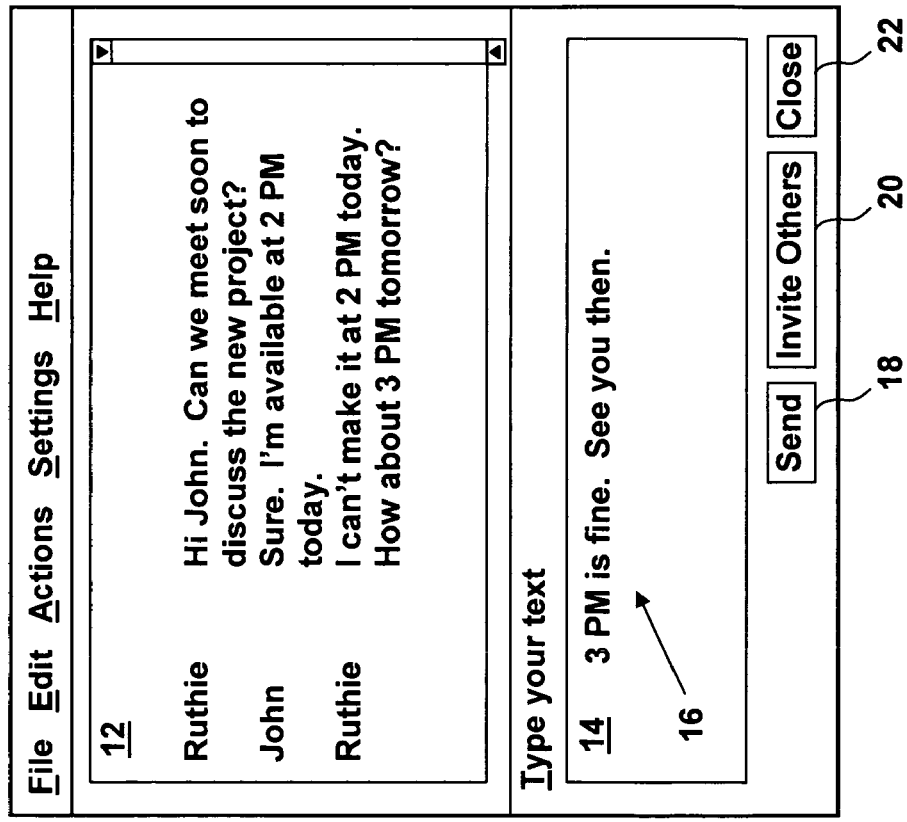
FIG. 1 depicts an illustrative IM interface in accordance with the prior art.
Figure 2:
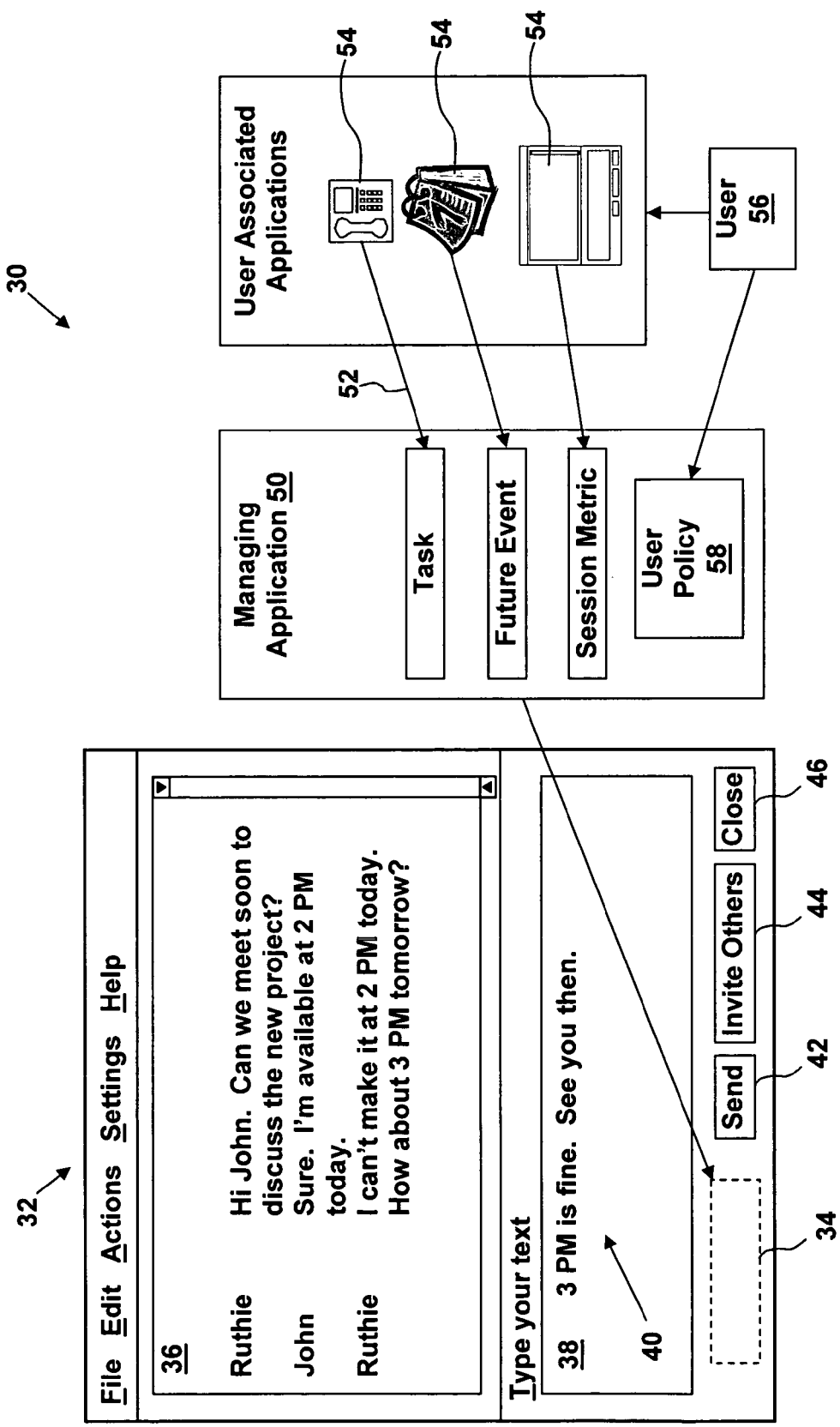
FIG. 2 depicts an illustrative system for providing an IM interface with dynamically generated message buttons in accordance with an embodiment of the present invention.

An illustrative message button generation system 30 for providing an IM interface 32 with one or more dynamically generated message buttons 34 in accordance with an embodiment of the present invention is depicted in FIG. 2. The IM interface 32 generally includes a conversation pane 36 for displaying a history of an IM session, a message pane 38 for displaying an IM message 40 to be sent, a Send button 42 for sending the IM message in the message pane 38 to the IM users involved in the IM session, an Invite Others button 44 for inviting other IM users into the IM session, and a Close button 46 for closing the IM interface 32. A managing application 50 selectively provides the IM interface 32 with one or more dynamically generated message buttons 34, based on a user policy 58.

The managing application 50 retrieves information 52 from one or more applications/backend systems 54 with which a user 56 has established an association (hereafter referred to as user associated applications 54). Under certain conditions during an IM session, the retrieved information 52 is formatted and one or more of the message buttons 34 are dynamically generated and rendered in real-time on the IM interface 32. A dynamically generated message button 34 is illustrated in phantom in FIG. 2 to represent the fact that it is not always present on the IM interface 32.

The user policy 58 provides information such as the particular IM message that will be sent to the IM users involved in the IM session upon actuation of a respective message button 34, the formatting of a message button 34 (e.g., the label displayed on the message button 34, the size/configuration of the message button 34, etc.), the criteria defining when a given message button 34 should be generated, the number of message buttons 34 allowed on the IM interface 32 at one time, the length of time a message button 34 is displayed by the IM interface 32, etc. This information can be provided by the user 56 via a preference dialog (e.g., in an IM client or in a user associated application 54) or other suitable mechanism. In general, the user policy 58 defines when, how, and under what circumstances a message button 34 is dynamically generated and displayed on the IM interface 32.

Figure 3:
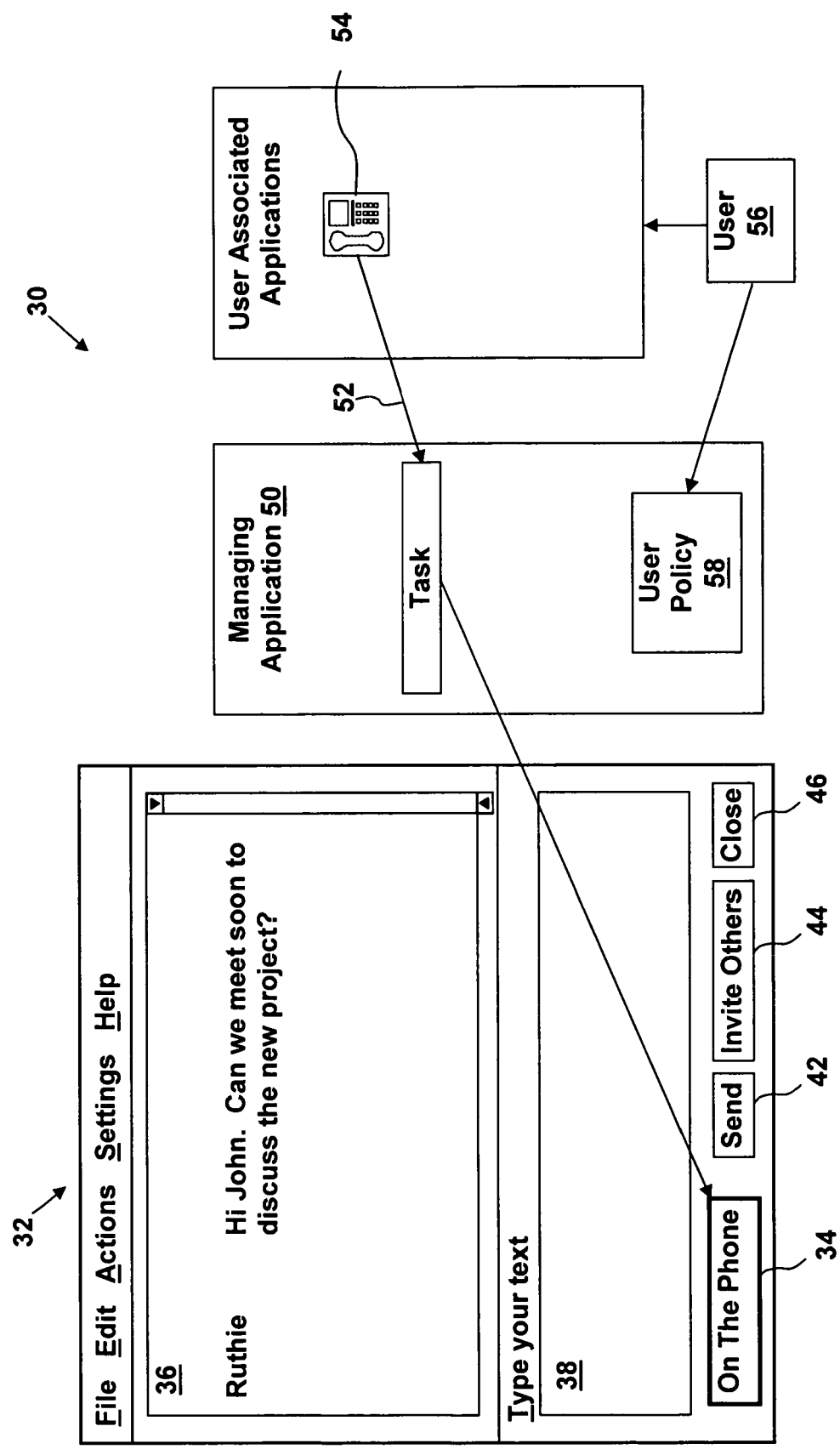
FIGS. 3-8 depict examples of the operation of the system of FIG. 2.
Figure 4:
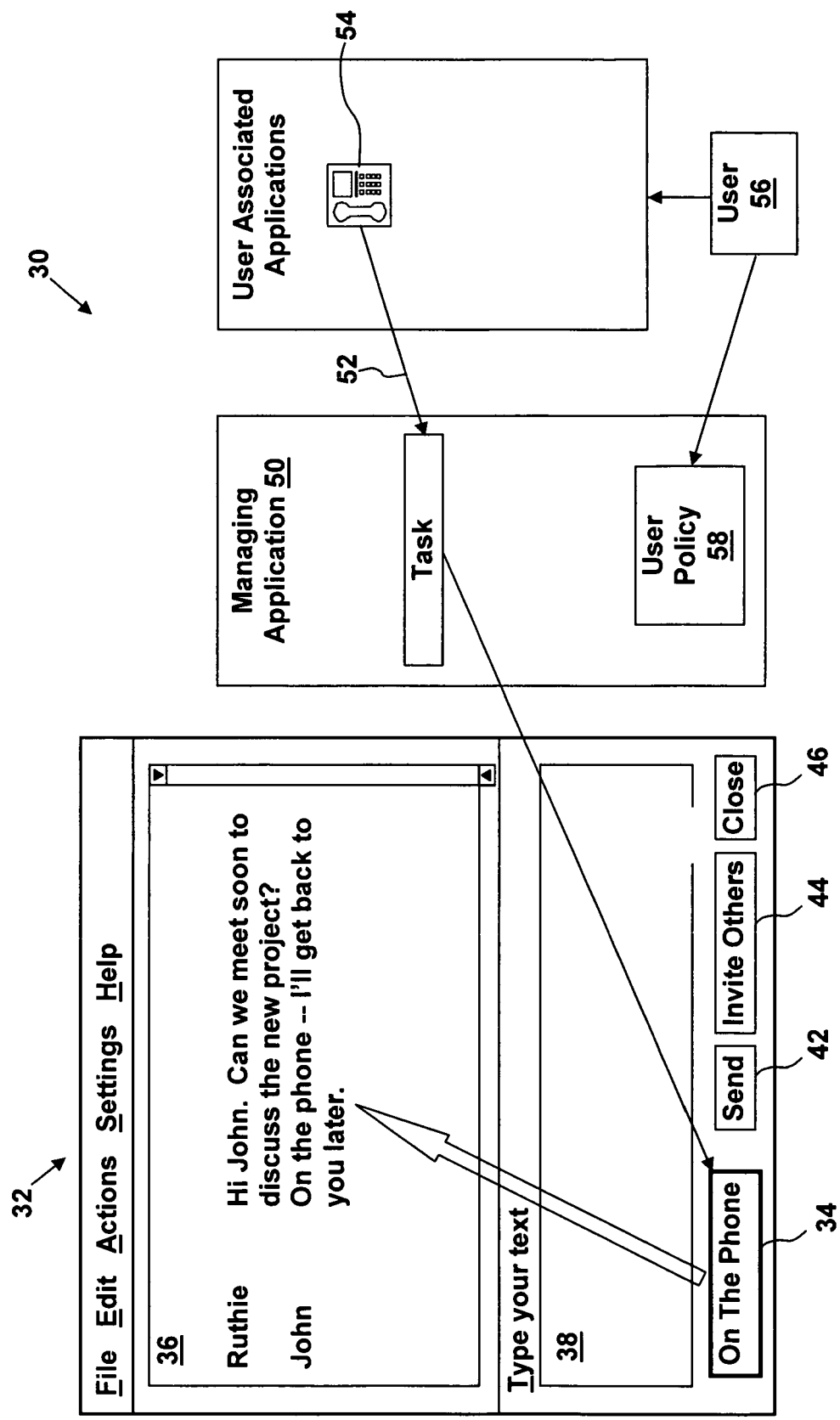

A first example of the operation of the present invention is illustrated in FIGS. 3 and 4. In this example, the user associated application 54 comprises a voice-over-IP (VoIP) application. The managing application 50 is configured to retrieve information 52 from the voice-over-IP (VoIP) application regarding an associated task being performed by the user 56, such as talking on the phone, retrieving voice mail, etc. The managing application 50 formats the retrieved information 52 according to the user policy 58 and dynamically generates a message button 34 in real-time on the IM interface 32. As shown in FIG. 3, for example, an "On the Phone" message button 34 can be dynamically generated in real-time on the IM interface 32 when the user 56 receives or places a phone call using the VoIP application. The user 56 can then selectively actuate the "On the Phone" message button 34 to send a predefined IM message such as "On the phone—I'll get back to you later" to the other IM users involved in the IM session, as shown in FIG. 4. Thus, instead of having to type the message in the message pane 38 of the IM interface 32 and then actuate the Send button 42, the user 56 can send the message simply by actuating the dynamically generated "On the phone" message button 34. This saves the user 56 time and effort and improves the efficiency of the user 56. The managing application 50 can be configured to remove the "On the Phone" message button 34 from the IM interface 32 when the user 56 performs a predefined action such as hanging up the phone (i.e., after completion of the task), terminating the VoIP application 54, etc., or in response to other condition(s) set forth in the user policy 58 (e.g., the expiration of a message display time limit).

Figure 5:
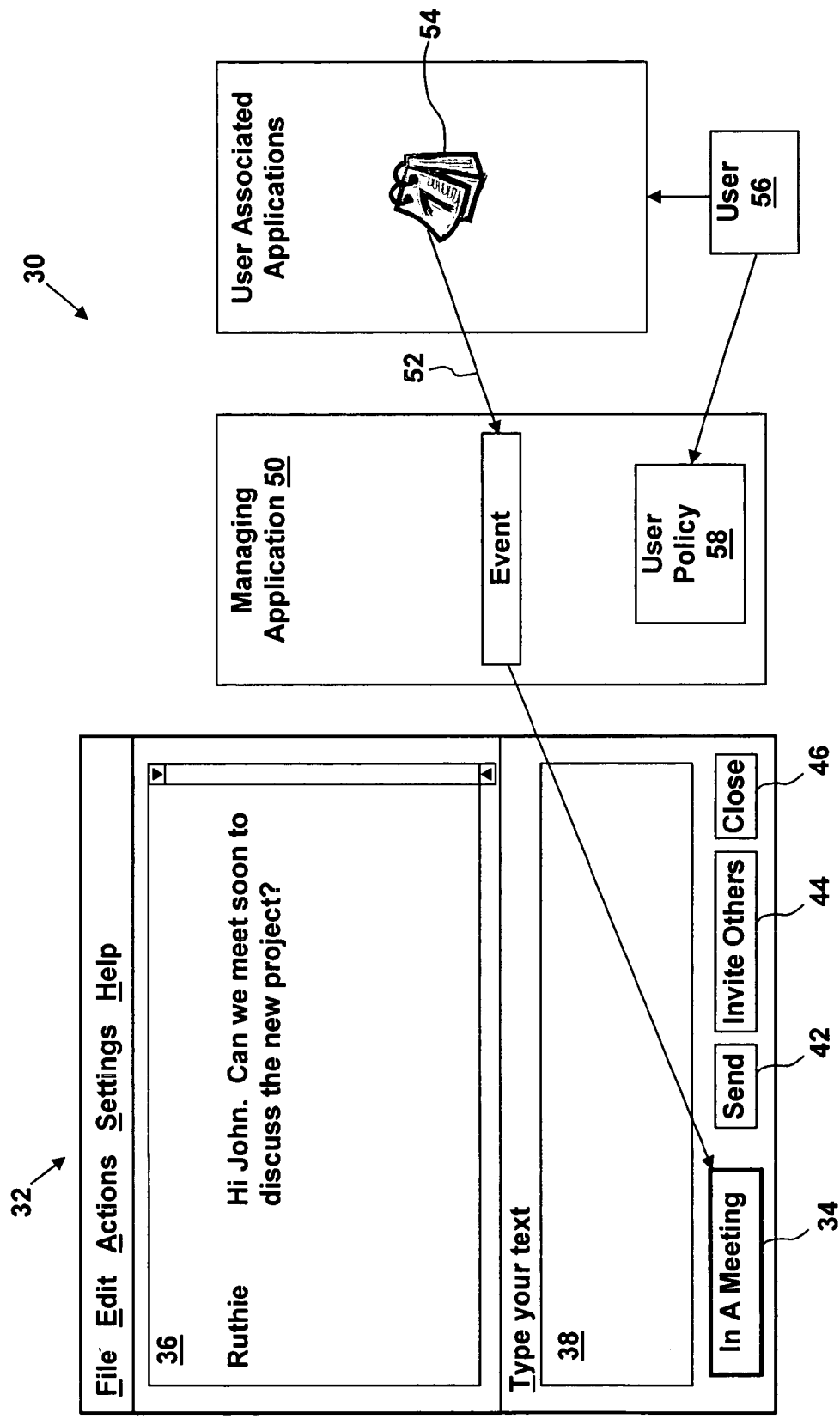
Figure 6:
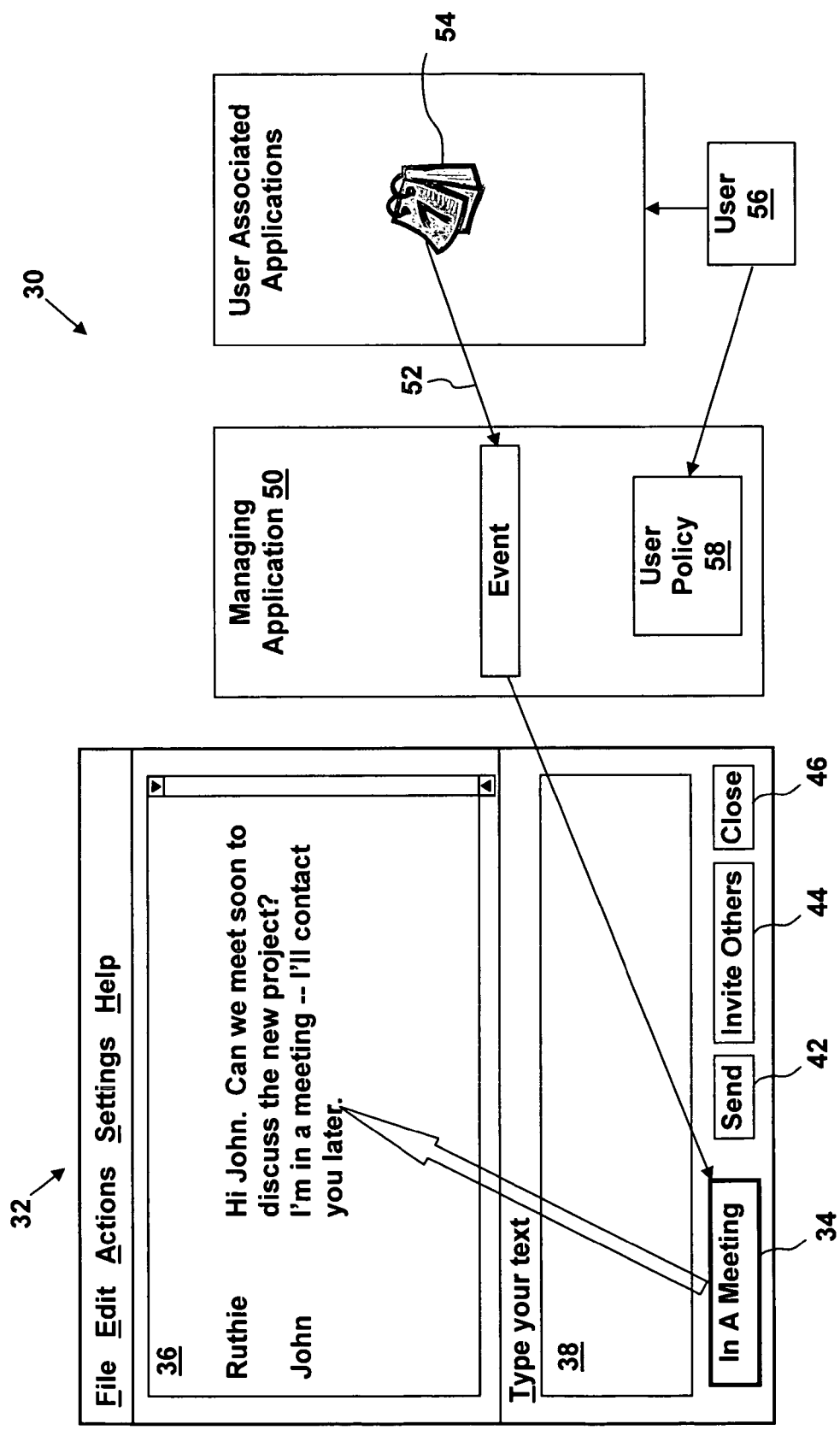

A second example of the operation of the present invention is illustrated in FIGS. 5 and 6. In this example, the user associated application 54 comprises a calendaring application. In this case, the managing application 50 is configured to retrieve information 52 from the calendaring application regarding upcoming events scheduled for the user 56, such as meetings, appointments, etc. The managing application 50 formats the retrieved information 52 according to the user policy 58 and dynamically generates a message button 34 in real-time on the IM interface 32. As shown in FIG. 5, for example, an "In a Meeting" message button 34 can be dynamically generated in real-time on the IM interface 32 if the user 56 is scheduled to attend a meeting in the near future (e.g., within the next ten minutes). The user 56 can then selectively actuate the "In a Meeting" message button 34 to send a predefined IM message such as "I'm in a meeting—I'll contact you later" to the other IM users involved in the current IM session, as shown in FIG. 6. Again, instead of having to type the message in the message pane 38 of the IM interface 32 and then actuate the Send button 42, the user 56 can send the message simply by actuating the dynamically generated "In a Meeting" message button 34. The "In a Meeting" message button 34 can be removed from the IM interface 32 by the managing application 50 after the meeting is scheduled to end (i.e., after completion/expiration of the event) or in response to other condition(s) set forth in the user policy 58 (e.g., the expiration of a message display time limit).

Figure 7:
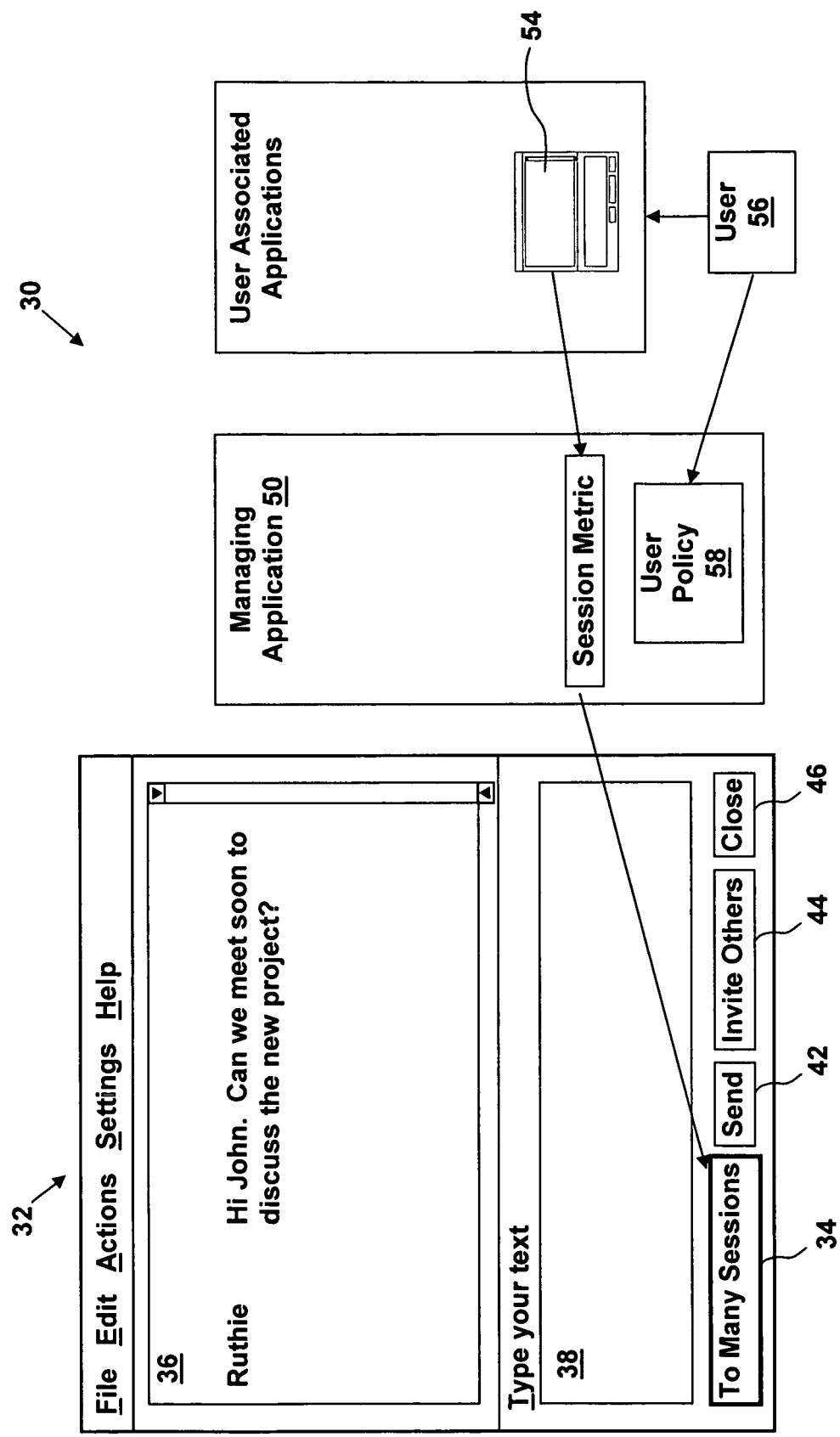
Figure 8:
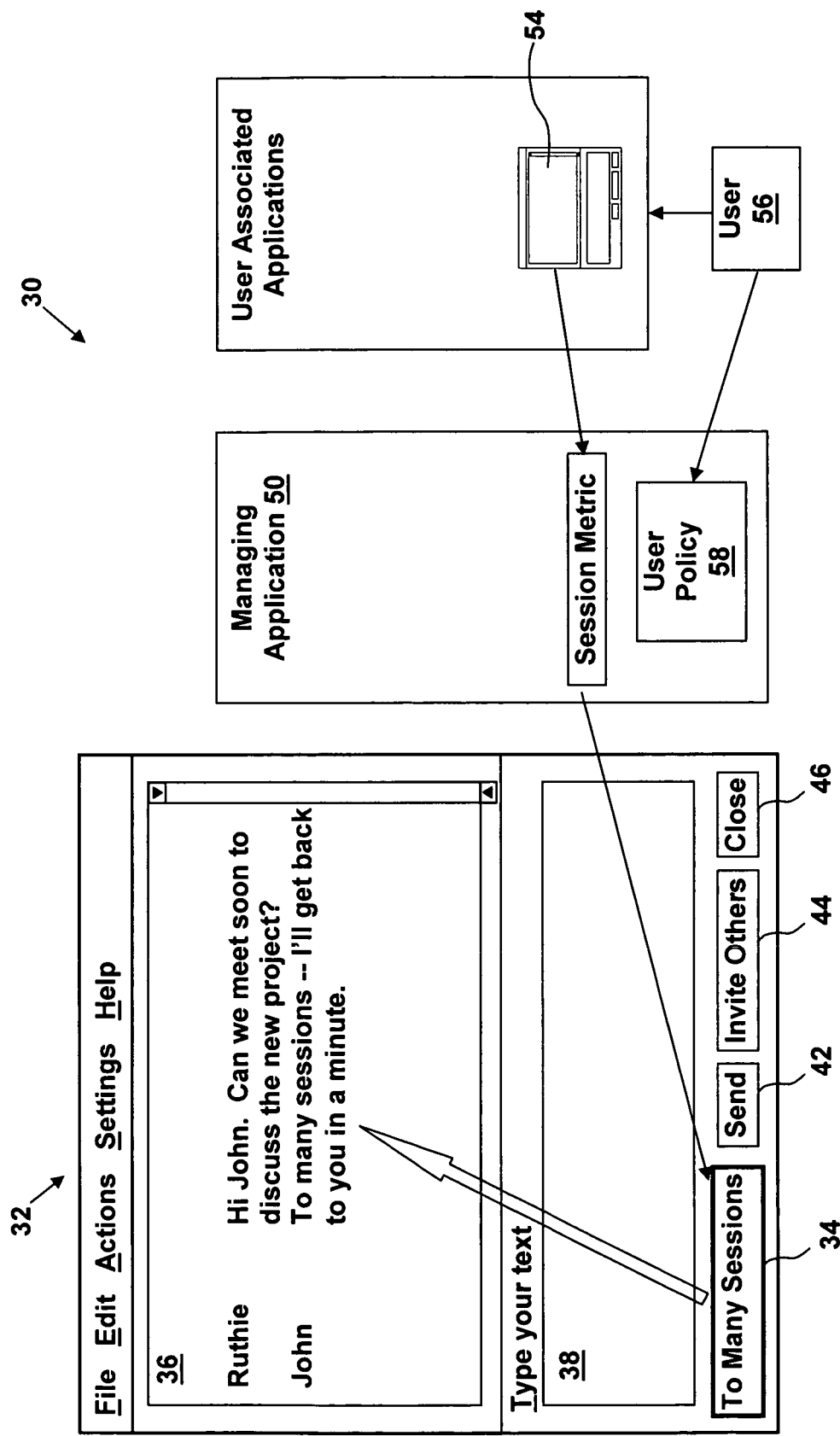

Yet another example of the operation of the present invention is illustrated in FIGS. 7 and 8. In this example, the user associated application 54 comprises the IM client itself, and the information 52 retrieved from the IM client by the managing application 50 is a system metric, such as a threshold for the maximum allowed number of active IM sessions. The managing application 50 formats the retrieved information 52 according to the user policy 58 and dynamically generates a message button 34 in real-time on the IM interface 32. As shown in FIG. 7, for example, a "To Many Sessions" message button 34 can be dynamically generated in real-time on the IM interface 32 if the number of active IM sessions exceeds the threshold for the maximum allowed number of active sessions. The user 56 can then selectively actuate the "To Many Sessions" message button 34 to send a predefined IM message such as "To many sessions—I'll get back to you in a minute" to the other IM users involved in the current IM session, as shown in FIG. 8. The "To Many Sessions" message button 34 can be removed from the IM interface 32 by the managing application 50 when the number of active IM sessions falls below the threshold or in response to other condition(s) set forth in the user policy 58 (e.g., the expiration of a message display time limit).

In each of the above-examples, the managing application 50 causes a message button 34 to be dynamically generated that "anticipates" the type of IM message that the user 56 might send under the same circumstances. For example, when the user 56 is performing a particular task connected with a user associated application 54, the managing application 50 provides a dynamically generated message button 34 which, if actuated by the user 56, will send an IM message providing information related to that task (e.g., "On the phone—I'll get back to you later"). Similarly, when the user 56 has an upcoming event (e.g., a meeting or appointment) connected with a user associated application 54, the managing application 50 provides a dynamically generated message button 34 which, if actuated, will send an IM message providing information related to that upcoming event (e.g., "I'm in a meeting—I'll contact you later").

The user associated applications 54 in the above-described examples are merely representative of many different types of applications that can be used in the practice of the present invention. Further, many other types of mechanisms in addition to those described above (i.e., tasks, future events, session metrics) can be associated with the dynamic generation of a message button 34 on the IM interface 32 of an IM client.

Figure 9:
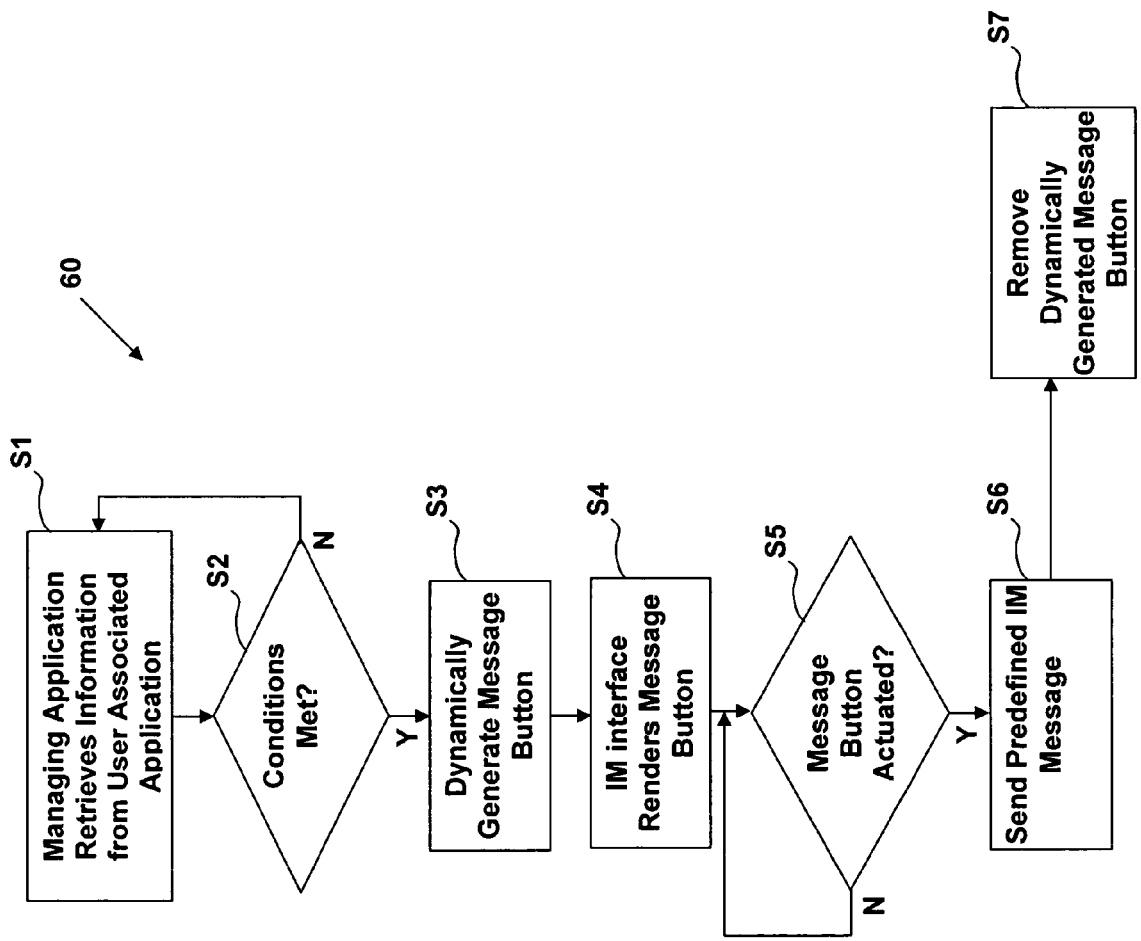
FIG. 9 depicts a flow diagram of a method in accordance with an embodiment of the present invention.

A flow diagram 60 of a method for providing an IM interface with one or more dynamically generated message buttons in accordance with an embodiment of the present invention is depicted in FIG. 9. The flow diagram 60 is described below in conjunction with the components of the illustrative system 30 depicted in FIG. 2.

In step S1, the managing application 50 retrieves information from a user associated application 54. In step S2, if predefined conditions set forth in the user profile 58 are met, a message button 34 is dynamically generated in step S3. In step S4, the dynamically generated message button 34 is provided to and rendered by the IM interface 32. In step S5, if the user 56 actuates the dynamically generated message button 34, a predefined message is sent to the other members of the IM session in step S6. In step S7, the dynamically generated message button 34 is removed from the IM interface 32 when it is no longer required. Removal criteria for the dynamically generated message button 34 can be provided by the user profile 58.

Figure 10:
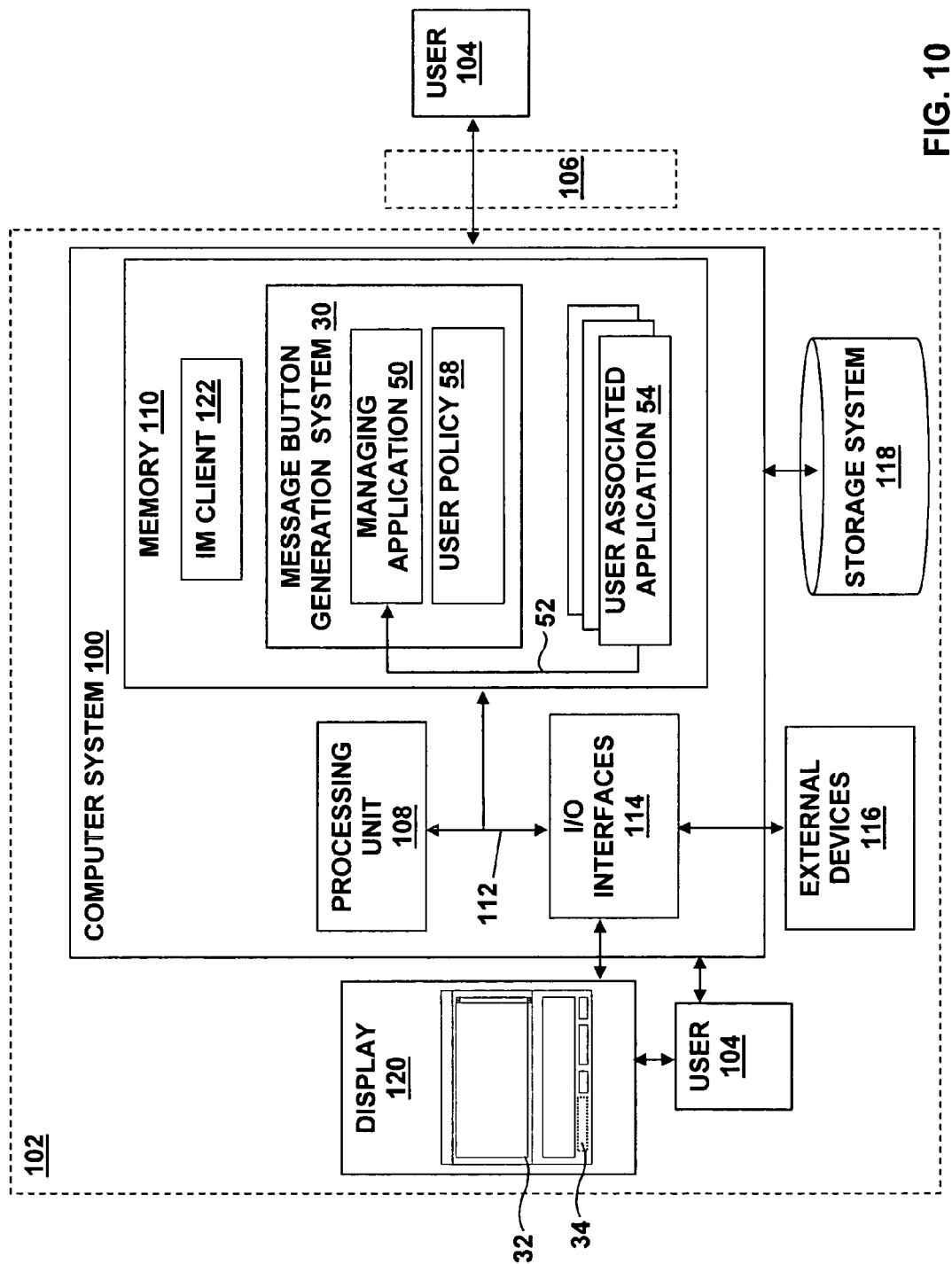
FIG. 10 depicts an illustrative computer system for implementing an embodiment of the present invention.

A computer system 100 for providing an IM interface with one or more dynamically generated message buttons in accordance with an embodiment of the present invention is depicted in FIG. 10. Computer system 100 is provided in a computer infrastructure 102. Computer system 100 is intended to represent any type of computer system capable of carrying out the teachings of the present invention. For example, computer system 100 can be a laptop computer, a desktop computer, a workstation, a handheld device, a server, a cluster of computers, etc. In addition, as will be further described below, computer system 100 can be deployed and/or operated by a service provider that offers a service for providing an IM interface with one or more dynamically generated message buttons in accordance with the present invention. It should be appreciated that a user 104 can access computer system 100 directly, or can operate a computer system that communicates with computer system 100 over a network 106 (e.g., the Internet, a wide area network (WAN), a local area network (LAN), a virtual private network (VPN), etc). In the case of the latter, communications between computer system 100 and a user-operated computer system can occur via any combination of various types of communications links. For example, the communication links can comprise addressable connections that can utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 100 is shown including a processing unit 108, a memory 110, a bus 112, and input/output (I/O) interfaces 114. Further, computer system 100 is shown in communication with external devices/resources 116 and one or more storage systems 118. In general, processing unit 108 executes computer program code, such as message button generation system 132, which is stored in memory 110 and/or storage system(s) 118. While executing computer program code, processing unit 108 can read and/or write data, to/from memory 110, storage system(s) 118, and/or I/O interfaces 114. Bus 112 provides a communication link between each of the components in computer system 100. External devices/resources 116 can comprise any devices (e.g., keyboard, pointing device, display (e.g., display 120, printer, etc.) that enable a user to interact with computer system 100 and/or any devices (e.g., network card, modem, etc.) that enable computer system 100 to communicate with one or more other computing devices.

Computer infrastructure 102 is only illustrative of various types of computer infrastructures that can be used to implement the present invention. For example, in one embodiment, computer infrastructure 102 can comprise two or more computing devices (e.g., a server cluster) that communicate over a network (e.g., network 106) to perform the various process steps of the invention. Moreover, computer system 100 is only representative of the many types of computer systems that can be used in the practice of the present invention, each of which can include numerous combinations of hardware/software. For example, processing unit 108 can comprise a single processing unit, or can be distributed across one or more processing units in one or more locations, e.g., on a client and server. Similarly, memory 110 and/or storage system(s) 118 can comprise any combination of various types of data storage and/or transmission media that reside at one or more physical locations. Further, I/O interfaces 114 can comprise any system for exchanging information with one or more external devices/resources 116. Still further, it is understood that one or more additional components (e.g., system software, communication systems, cache memory, etc.) not shown in FIG. 10 can be included in computer system 100. However, if computer system 100 comprises a handheld device or the like, it is understood that one or more external devices/resources 116 (e.g., a display) and/or one or more storage system(s) 118 can be contained within computer system 100, and not externally as shown.

Storage system(s) 118 can be any type of system (e.g., a database) capable of providing storage for information under the present invention. To this extent, storage system(s) 118 can include one or more storage devices, such as a magnetic disk drive or an optical disk drive. In another embodiment, storage system(s) 118 can include data distributed across, for example, a local area network (LAN), wide area network (WAN) or a storage area network (SAN) (not shown). Moreover, although not shown, computer systems operated by user 104 can contain computerized components similar to those described above with regard to computer system 100.

Shown in memory 110 (e.g., as computer program products) are an IM client 122 and a message button generation system 30 for providing an IM interface 32 (e.g., of IM client 122) with one or more dynamically generated message buttons 34 in accordance with an embodiment of the present invention. The message button generation system 30 includes a managing application 50 and a user policy 58.

The managing application 50 is configured to retrieve information 52 from one or more user associated applications 50. Under certain conditions during an IM session, the retrieved information 52 is formatted and one or more of the message buttons are dynamically generated and rendered in real-time on the IM interface by the managing application 50. The user policy 58 defines when, how, and under what circumstances a message button 34 is dynamically generated by the managing application 50 and displayed on the IM interface 32.

The present invention can be offered as a business method on a subscription or fee basis. For example, one or more components of the present invention can be created, maintained, supported, and/or deployed by a service provider that offers the functions described herein for customers. That is, a service provider can be used to offer a service for providing an IM interface with one or more dynamically generated message buttons, as described above.

It should also be understood that the present invention can be realized in hardware, software, a propagated signal, or any combination thereof. Any kind of computer/server system(s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product or a propagated signal, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, removable computer diskette, random access memory (RAM), read-only memory (ROM), rigid magnetic disk and optical disk. Current examples of optical disks include a compact disk—read only disk (CD-ROM), a compact disk—read/write disk (CD-R/W), and a digital versatile disk (DVD).

Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method for providing an instant messaging (IM) window with a dynamically generated message button, comprising:

retrieving information from a user associated application, wherein the information retrieved from the user associated application is associated with one of a task or an event, the task including one of talking on the phone or checking voicemail, and the event including one of an appointment or a meeting;

dynamically generating a message button based on the retrieved information and a user policy;

formatting the dynamically generated message button based on the one of the task or the event;

rendering the dynamically generated message button within the IM window;

sending a predefined IM message to at least one participant in an IM session in response to the actuation of the dynamically generated message button by a distinct participant in the IM session, wherein the predefined IM message is associated with the one of the task or the event and indicates an availability of the distinct participant to participate in the IM session; and removing the dynamically generated message button from the IM window in response to completion of the one of the task or the event.

2. The method of claim 1, further comprising:
actuating the dynamically generated message button.

3. The method of claim 1, wherein the event is a future event.

4. A method for deploying an application for providing an instant messaging (IM) window with a dynamically generated message button, comprising:

providing at least one computer being operable to:

retrieve information from a user associated application, wherein the information retrieved from the user associated application is associated with one of a task or an event, the task including one of talking on the phone or checking voicemail, and the event including one of an appointment or a meeting;

dynamically generate a message button based on the retrieved information and a user policy;

format the dynamically generated message button based on the one of the task or the event;

render the dynamically generated message button within the IM window;

send a predefined IM message to at least one participant in an IM session in response to an actuation of the dynamically generated message button by a distinct participant in the IM session, wherein the predefined IM message is associated with the one of the task or the event and indicates an availability of the distinct participant to participate in the IM session; and remove the dynamically generated message button from the IM window in response to completion of the one of the task or the event.

5. A system for providing an instant messaging (IM) window with a dynamically generated message button, comprising:

at least one computing device comprising:

a system for retrieving information from a user associated application, wherein the information retrieved from the user associated application is associated with one of a task or an event, the task including one of talking on the phone or checking voicemail, and the event including one of an appointment or a meeting;

a system for dynamically generating a message button based on the retrieved information and a user policy;

a system for formatting the dynamically generated message button based on the one of the task or the event;

a system for rendering the dynamically generated message button within the IM window;

a system for sending a predefined IM message to at least one participant in an IM session in response to an actuation of the dynamically generated message button by a distinct participant in the IM session, wherein the predefined IM message is associated with the one of the task or the event and indicates an availability of the distinct participant to participate in the IM session; and a system for removing the dynamically generated message button from the IM window in response to completion of the one of the task or the event.

6. The system of claim 5, further comprising:

a system for actuating the dynamically generated message button.

7. The system of claim 5, wherein the event is a future event.

8. A program product stored on a non-transitory computer readable storage medium for providing an instant messaging (IM) window with a dynamically generated message button, the non-transitory computer readable storage medium comprising program code for performing the steps of:

retrieving information from a user associated application, wherein the information retrieved from the user associated application is associated with one of a task or an event, the task including one of talking on the phone or checking voicemail, and the event including one of an appointment or a meeting;

dynamically generating a message button based on the retrieved information and a user policy;

formatting the dynamically generated message button based on the one of the task or the event;

rendering the dynamically generated message button within the IM window;

sending a predefined IM message to at least one participant in an IM session in response to the actuation of the dynamically generated message button by a distinct participant in the IM session, wherein the predefined IM message is associated with the one of the task or the event and indicates an availability of the distinct participant to participate in the IM session; and removing the dynamically generated message button from the IM window in response to completion of the one of the task or the event.

9. A method for providing an instant messaging (IM) window, comprising:

retrieving information from an application, wherein the information retrieved from the application is associated with one of a task or an event, the task including one of talking on the phone or checking voicemail, and the event including one of an appointment or a meeting;

dynamically generating a message button based on the retrieved information and a user policy, wherein the dynamically generated message button is associated with a predefined IM message;

rendering the dynamically generated message button within the IM window;

sending the predefined IM message to at least one participant in an IM session in response to an actuation of the dynamically generated message button by a distinct participant in the IM session, wherein the predefined IM message is associated with the one of the task or the event and indicates an availability of the distinct participant to participate in the IM session; and removing the dynamically generated message button from the IM window in response to completion of the one of the task or the event.

10. The method of claim 1, wherein the predefined IM message is associated with the task.

11. The method of claim 10, wherein the task is talking on the phone.

12. The method of claim 10, wherein the task is checking voicemail.

13. The method of claim 1, wherein the predefined IM message is associated with the event.

14. The method of claim 13, wherein the event is the appointment.

15. The method of claim 13, wherein the event is the meeting.

16. The system of claim 5, wherein the predefined IM message is associated with the task.

17. The method of claim 16, wherein the task is talking on the phone.

18. The system of claim 16, wherein the task is checking voicemail.

19. The system of claim 5, wherein the predefined IM message is associated with the event.

20. The system of claim 19, wherein the event is the appointment.

21. The system of claim 19, wherein the event is the meeting.

22. The program product of claim 8, wherein the predefined IM message is associated with the task.

23. The program product of claim 22, wherein the task is talking on the phone.

24. The program product of claim 22, wherein the task is checking voicemail.

25. The program product of claim 8, wherein the predefined IM message is associated with the event.

26. The program product of claim 25, wherein the event is the appointment.

27. The program product of claim 25, wherein the event is the meeting.

\* \* \* \* \*